United States Patent
Fernandes Feiticeiro Soares Delicado et al.

(10) Patent No.: US 11,601,712 B2
(45) Date of Patent: Mar. 7, 2023

(54) PREDICTIVE TUNING SYSTEM

(71) Applicant: Nos Inovacao, S. A., Senhora da Hora (PT)

(72) Inventors: Nelson Fernandes Feiticeiro Soares Delicado, Cacilhas (PT); Catarina Alexandra Marques Vital, Caxias (PT); Barbara Maria Garbacz, Lisbon (PT); Sonia Sofia Santos Rodrigues, Atalaia (PT); Mario Magalhaes Saraiva, Lisbon (PT); Andre Ramalho Dos Santos Rosado, Lisbon (PT); Ana Raquel Dos Reis Fernandes Gama, Lisbon (PT); Bruno De Sousa Rosa Da Cruz Fernandes, Oeiras (PT)

(73) Assignee: NOS INOVACAO, S.A., Senhora da Hora (PT)

( * ) Notice: Subject to any disclaimer, the term of this patent is extended or adjusted under 35 U.S.C. 154(b) by 1149 days.

(21) Appl. No.: 16/478,017

(22) PCT Filed: Feb. 24, 2017

(86) PCT No.: PCT/IB2017/051075
§ 371 (c)(1),
(2) Date: Jul. 15, 2019

(87) PCT Pub. No.: WO2017/145109
PCT Pub. Date: Aug. 31, 2017

(65) Prior Publication Data
US 2019/0356947 A1 Nov. 21, 2019

(30) Foreign Application Priority Data
Feb. 24, 2016 (PT) .......................... 109185

(51) Int. Cl.
*H04N 21/438* (2011.01)
*H04N 5/50* (2006.01)
(Continued)

(52) U.S. Cl.
CPC .......... *H04N 21/4384* (2013.01); *H04N 5/50* (2013.01); *H04N 21/4263* (2013.01); *H04N 21/44224* (2020.08); *H04N 21/6118* (2013.01)

(58) Field of Classification Search
CPC .. H04N 21/4384; H04N 5/50; H04N 21/4263; H04N 21/44224; H04N 21/6118; H04N 21/44204
See application file for complete search history.

(56) References Cited

U.S. PATENT DOCUMENTS

| 8,099,680 B1 * | 1/2012 | Kolde ................ H04N 21/4316 725/39 |
| 2002/0006743 A1 | 1/2002 | Kanagawa et al. |

(Continued)

FOREIGN PATENT DOCUMENTS

| WO | 02/087243 A2 | 10/2002 |
| WO | 2004082150 A2 | 9/2004 |

OTHER PUBLICATIONS

International Search Report and Written Opinion dated Jun. 6, 2017 for International Application No. PCT/IB2017/051075.

(Continued)

*Primary Examiner* — Benjamin R Bruckart
*Assistant Examiner* — Tien M Nguyen
(74) *Attorney, Agent, or Firm* — Lucas & Mercanti, LLP

(57) ABSTRACT

A predictive tuning system is disclosed in order to reduce the tuning channel delay time in a cable TV architecture. The system comprises a set-top box (STB) configured to instantiate a given number of video decoding pipelines allowing for start broadcasting a particular set of channels which (Continued)

include a sub-set of pre-define channels, such as the antecessor and predecessor channels which are normally pre-tuned, and other sub-set of channels chosen using a predictive algorithm. This algorithm runs locally at the user interface level of the STB suggesting the more likely channels to be watched by the user according to his past behavior according to a specific time slot of a day.

12 Claims, 4 Drawing Sheets

(51) Int. Cl.
*H04N 21/426* (2011.01)
*H04N 21/61* (2011.01)
*H04N 21/442* (2011.01)

(56) References Cited

U.S. PATENT DOCUMENTS

| | | | |
|---|---|---|---|
| 2003/0056216 A1* | 3/2003 | Wugofski | H04N 21/482 348/E5.097 |
| 2003/0159157 A1* | 8/2003 | Chan | H04N 21/4532 725/38 |
| 2007/0014655 A1 | 1/2007 | Tygard | |
| 2010/0275229 A1* | 10/2010 | Civanlar | H04N 19/162 725/39 |
| 2014/0351835 A1* | 11/2014 | Orlowski | H04N 21/44204 725/9 |

OTHER PUBLICATIONS

IPRP dated Aug. 28, 2018 for International Application No. PCT/IB2017/051075.

* cited by examiner

PREDICTIVE TUNING SYSTEM

CROSS-REFERENCE TO RELATED APPLICATIONS

This application is a 371 of PCT/IB2017/051075 filed Feb. 24, 2017, which claims the benefit of Portuguese Patent Application No. 109185 filed Feb. 24, 2016, both applications are incorporated herein by reference.

TECHNICAL FIELD

The present disclosure generally relates to a predictive method for reduce the tuning channel delay time in a cable TV architecture.

BACKGROUND ART

The action of changing channels is called zapping and the time since the user clicks on a button until he starts to watch the new channel is called zapping time or zapping delay. Channel zapping time is a Quality of Experience key factor.

From the state of the art, we know about the use of three primers available in the same set-top box (STB) where two of them are reserved for the up and down channel's successor and predecessor. This technical solution allows to have a better experience when the user is making zapping through all the channels list in a sequential way.

However, if the user make zapping through the channels list in a non-sequential way, the zapping delay is still highly perceived, especially in cable TV architectures.

In the document US 2007/0146551 A1, the channel is predicted based on a subset of digits input by a user. While a current channel is tuned by one tuner, the predicted channel is tuned by the other tuner. If the prediction is correct, the channel to be tuned is available for presentation immediately after a time out period. Thus, delay between tuning channels is reduced. The users click in an alphanumeric button, inserting the first digit of the channel that want to watch. The correspondent channel is tuned by the free tuner. A predetermined time-out starts to count: if the time-out is elapsed the STB just have to tune the other tuner, otherwise, a second digit was input and that two digit channel is tuned to the free tuner. The process is repeated until a max of three digits channel is input. The proposed algorithm is executed in a two tuners STB architectures, and despite the objective of trying to reduce the zapping time be the same, the overall concept of this solution is not equivalent to the one proposed by the predictive tuning system because the prediction of the channel only starts before the first click on a button. On the other hand, the predictive tuning system herein proposed disclosed a new STB architecture with three tuners and capable of instantiate a pre-define number of video pipelines in order to starts decoding the most likely channels watched by the user prior to its direct intervention with the system.

In the document US 2002/0067438 A1, the channel is predicted based on the past user's behavior. If the predicted channel is equal to the channel that is being watch, another prediction is made, until a channel with a different frequency is found. The data can be stored, locally, in a hard drive. This solution protects the possibilities of having more than one tuner and multiple profiles, but the algorithm does not take into account the period of the day in its predictions. Besides that the algorithm has a periodically memory limitation control, modelling the passage of time. In respect with the predictive tuning system proposed the memory limitation control has a more efficient behaviour since it's not periodic allowing to record the transition channel flow in a continuous way, like a moving window. The prediction is also more accurate since the algorithm considers the different behaviours of a user during the day, by dividing it in a predefined number of time slots.

SUMMARY

The present application discloses a set-top box application framework characterized by being implemented at middleware level, interconnecting the software user interface layer and the hardware implementation layer, wherein said application framework is configured to instantiate a set of video decoding pipelines configured to pre-tune a predefined number of channels, $(c+\beta)$.

In one embodiment the application framework is configured to pre-tune a predefined number of channels, $\beta$, in addition to the predictive channels, c, representing the antecessor and the predecessor channels of the currently tuned channel.

In another embodiment the application framework is configured to pre-tune a predefined number of channels, $\beta$, in addition to the predictive channels, c, representing predefined channels different from the one currently tuned.

The present application also discloses a predictive tuning system characterized by a Set-top box architecture that includes:
  $\theta$ number of tuners at the physical level;
  An abstraction layer comprising:
    i. An user interface level;
    ii. the application framework of the claims 1 to 3;
    iii. A Client module configured to find $\beta$ channels that are always primed.

In one embodiment of the Predictive tuning system, the application framework is configured to instantiate a $(c+\beta)$ number of video decoding pipelines for $\theta$ Transport Stream, wherein c is a predefined number of channels predicted from the algorithm, and $\beta$ is a predefined number of channel that should always be primed.

In another embodiment of the Predictive tuning system the Client module is configured to find the predecessor channel, $c_e(k)+1$, and the antecessor channel, $c_e(k-1)$, of the currently tuned channel, $c_e$.

In another embodiment of the Predictive tuning system each of the $\theta$ tuners are configure to tuning a specific Transport Stream carrier.

In another embodiment of the Predictive tuning system wherein $\beta=2$, each of the $(c+2)$ video decoding pipelines are configured to:
  Pre-tune the predecessor channel, $c_e(k)+1$, of the channel $c_e$;
  Pre-tune the antecessor channel, $c_e(k-1)$, of the channel $c_e$;
  Pre-tune c channels.

The present application also discloses a Predictive tuning algorithm configured to be implemented in the set-top box architecture presented, being characterized by pre-tuning a pre-define number of channels, c, according to the following steps:
  Set-top box, in every channel changed event, transmits the information regarding:
    i. The channel inputted by the user, $c_e$;
    ii. The respective time of watch, h;
    iii. A pre-define number of channels, c;
    iv. The watched channels memory array corresponding to the time slot xxyy of h;

Update and analyze the watched channels memory array;

Output a number of c channels according to the watched channels memory array in that time slot and the fixed $\beta$ channels that are always primed.

In one embodiment of the Predictive tuning algorithm the time slot has a configurable time period.

In another embodiment of the Predictive tuning algorithm the memory channels array for each time slot is characterized by a matrix of channels, channels_matrix_xxyy and a vector of channels, memory_channels_list_xxyy.

In another embodiment of the Predictive tuning algorithm the channels_matrix_xxyy is a matrix with two rows and as many columns as the sum of the number of visualizations of the last x channels.

In another embodiment of the Predictive tuning algorithm the memory_channels_list_xxyy is a vector with a FIFO behavior and configurable number of columns, x, recording the channel's flow transition.

In another embodiment of the Predictive tuning algorithm the update of the watched channels array comprise the following steps:

In the channels_matrix_xxyy decrement in one unit the number of visualizations of the channel that leaves the memory_channels_list_xxyy; and If it became zero the channel is removed from the channels_matrix_xxyy by eliminating its column;

In the channels_matrix_xxyy increment in one unit the number of visualizations of the channel $c_e$ and record the channel in the memory_channels_list_xxyy; in case of first time watch in the last x watch channels, the $c_e$ will be added to the channels_matrix_xxyy and its visualization number will be incremented in one unit.

In another embodiment of the Predictive tuning algorithm the output of c channels is comprised by the following steps:

select the $(c+\beta+1)$ channels with the higher number of visualizations in the channels_matrix_xxyy and save them in the favorite_channel_list;

If either the actual channel $c_e$, or any of the $\beta$ channels that are always primed, aren't a favorite channels, the c first channels in the favorite_channel_list are chosen; or if one of the actual channel $c_e$, or any of the $\beta$ channels that are always primed, are one of the c first favorite channels, those are changed with the remaining ones.

DISCLOSURE

The system proposed herein solves the problem of the reduction of tuning channel delay time in a cable TV architecture.

The algorithm implementation is based on three main issues:

1) The user's behavior based on statistical inspection of databases of zapping events;
2) Development of a predictive algorithm to suggest the most probable channels to be watched;
3) Integration of said algorithm within a specific STB architecture.

To study the user's behavior in changing channels, a data base of zapping events, collecting the zapping history of the users, was analyzed. By statistical inspection it was possible to find visualization patterns in the user's zapping behavior, reason why it is feasible to predict the next user zap, with an admissible accuracy, i.e. the zapping procedure is not a random procedure. Despite those patterns, it is also possible to conclude that the behavior of a user in zapping is seasonal, which means that the behavior is different in working days, weekends or even in the Christmas season, for instance. The user's behavior also changes during the different periods of the same day, namely morning, afternoon and night, or in days with special events, such as soccer games, among others.

Therefore, the proposed solution consists of an algorithm that suggest c more likely channels to be chosen by the user, where c is a predefine number of most probable channels that could be selected according to his historic watched channels. The identification of visualization patterns in the user's zapping behavior during the 24 hours of a day led to a division into a predefine number of time slots, xxyy, for instance: 00 h to 07 h, 08 h to 16 h, 17 h to 19 h and 20 h to 23 h. The number of time slots and its time periods are configurable. This specification is very important since offers the capability to divide the user into a group of users with equal profiles allowing to map his visualization trends within a specific time slot. For instance, if during the afternoon period only series/movies channels are watched or at the night time only news channels are viewed, the algorithm take this pattern into account to adapt in a more accurate way the memory list of the watched channels in the corresponding time slots. In this way, the day time slots number is a function of the user's mass behavior.

The zapping event is just considered if and only if the user watches the channel for more than a threshold period, for example 1 minute. When a zapping event is detected the STB gives to the algorithm the following variables as inputs: the number of most probable channels to be watched, c, the channel that the user wants to watch, $c_e$, and the zapping event time in hours, h. Using this information, particularly the desired channel $c_e$ and respective time of watch, h, the algorithm updates the watched channels memory array by incrementing the number of visualizations of the desired channel in a matrix called channels_matrix_xxyy, which has the following structure:

$$\begin{bmatrix} \text{channel id} & \ldots \\ \text{\#visualizations} & \ldots \end{bmatrix}$$

This matrix has always two rows and as many columns as the number of different channels watched by the user. In the first row are registered the channel's grid position and in the second row are recorded the number of times that the user watched the corresponding channel. Every time slot has its own channels_matrix_xxyy.

In every channel changed event, the algorithm also updates a vector representing the watched channels according to the respective time slot xxyy. The memory_channels_list_xxyy has a FIFO (first in first out) behavior where the recent watched channels are on the left and the old watched channels are on the right of the list. This vector has the following structure:

[channel 1 channel 2 channel 3 channel 1 channel 5 . . . ]

and has one row and x columns, where:

big values of x imply an algorithm with a big memory of the watched channels, less adaptive to user behavior changes;

low values of x imply an algorithm with low memory of the watched channels and consequently the favorite channels may not be accurate enough.

So, the x value could be configurable and must be adaptive to the user profile, i.e. the x value should be directly proportional to the number of different watched channels.

In this way, the user profile is defined using the matrix and the list of channels of each time slot, which are continuously updated in every channel changed event. This information is loaded to the predictive algorithm every time the user turns his STB on and identifies himself to the system.

The predictive algorithm disclosed has a control memory limitation which is based on the manipulation of the watch channel memory, specifically by updating the channels_matrix_xxyy and the memory_channels_list_xxyy in every channel changed event. For instance, when the user choose other channel to watch, the watched channels memory array is updated: In the channels_matrix_xxyy the number of visualization of the channel that leaves the memory_channels_list_xxyy is decremented in one unit and if it became zero the channel is removed from the matrix by eliminating the respective column. This phase represents the limitation that the algorithm impose, to control the impact of the user' seasonality behavior. If the user never watched the channel $c_e$ in the last x watched channels, this channel will be added to the matrix and its visualization number will be incremented in one unit.

In terms of hardware, the state of the art STB architectures are equipped with three tuners at physical level, having each one capability for tuning a specific carrier and lookup for the audio/video program identifier ($P_{id}$) of the set of 8 to 10 channels that could be grouped in a specific Transport Stream (TS), depending on its bandwidth.

In order to run the predictive algorithm a set-top box architecture is proposed together with the development of a specific application framework allowing not only to pre-tune a specific channel in a TS, but also to instantiate a variable number of video decoding pipelines, the so-called "video-primer", for the set of TSs. In fact there is a relation between the number of tuners of the STB and the number of tuned TS. So, considering there is θ tuners available in the STB architecture one can tune θ TSs, since each tuner is able to tune one TS at a time. The number of video decoding pipelines represents a trade-off between system performance and number of channels pre-tuned. This application framework is implemented at the middleware layer of the STB, being the abstraction layer interconnecting the hardware implementation level and the software level where all the TV services and user interface applications are implemented. Due to its control memory limitation the predictive algorithm is executed in a software stack at the user interface level of the STB. The FIG. 3 shows the block level architecture of the STB.

With this approach, it becomes possible not only to have the algorithm statically defined in the STB but also to make it available by downloading an updated version from a frontend service, thus reducing the overhead for deploying a newer version of the algorithm.

This technical specifications in terms of organizational architecture features enables that a pre-defined number of broadcasted $P_{ids}$ in a given TS can start being decoded. In fact, by analyzing the channel's number of visualizations, from the channels' matrix, the (c+β+1) most visualized channels are chosen and saved in a favorite_channel_list, defining the channels that will be primed, wherein c are the number of channels given by the predictive algorithm and β a pre-defined number of channels that should always be primed, such as the predecessor and the antecessor's channel of the tuned channel. Considering is this the case, if either the actual channel $c_e$, the up channel $c_e(k)+1$ or the previous channel $c_e(k-1)$ aren't a favorite channels, the c first channels in the favorite_channel_list are chosen. Otherwise if one of those channels are one of the c first favorite channels, those are changed with the remaining ones. Once again the favorite channels depend on the day period, due to the time slot specification. Of course one can also define that there is no obligation in pre-tuning a particular set of channels, β, and in that case the channels selected to be primed will be the ones given just by the predictive algorithm. The combination of fixed channels, β, and the channels outputted from predictive algorithm's allows the predictive system to cope with different users behaviours, since there are users more likely to perform a sequential channel change, for example, than others. Because of that, the definition of this channels properties is user dependent. All of the STB functionality is controlled at the user interface level, by invoking application programming interfaces, APIs, that map to the various underlying libraries.

At the software level the STB uses an operating system, on top of which several specific modules targeted at providing TV services are included. This basically composes what is commonly referred to as the Reference Design Kit layer (RDK layer). Most STBs that use the RDK framework also make use of a browser to implement the top-layer of the architecture.

It is also used a module, denoted as Client, which is responsible for providing the interface between the user interface level and the STB AF, via browser and specific API calls (e.g. the electronic program guide, EPG). This module is implemented at the browser and as an independent process flow from the predictive stage.

Considering a channel change event triggered by the user, in the described architecture, the channel change function is initiated at the user interface level, by commanding the STB AF, via Client module, to execute the channel tune of the selected target channel.

In terms of the priming function, one can consider that the predecessor and the antecessor of the currently tuned channel should always be primed. This selection is currently implemented at the Client level. More specifically, this module determine which channels should be primed, based on the predictive algorithm's output and afterwards uses the information about the channel grid and the DVB-C (Digital Video Broadcast-Cable) streams, obtained from the EPG and other frontend services, to translate the channel positions into the parameters to be passed on to the video library used at the STB AF, the RMF module (carrier frequency, modulation, service IDs), for priming the successor and predecessor channels, as can be seen in FIG. 4.

Furthermore, API calls at the user interface could be used in order to obtain information regarding the composition of the DVB-C Transport Streams. This allow the predictive algorithm to take into consideration the maximum number of simultaneously tuned TSs. The FIG. 4 shows the proposed methods and required APIs to implement the predictive algorithm at the user interface level.

BRIEF DESCRIPTION OF DRAWINGS

The features and advantages of the present invention disclosed herein can be better understood with reference to the following drawings, in which.

DESCRIPTION OF EMBODIMENTS

Figure 1:
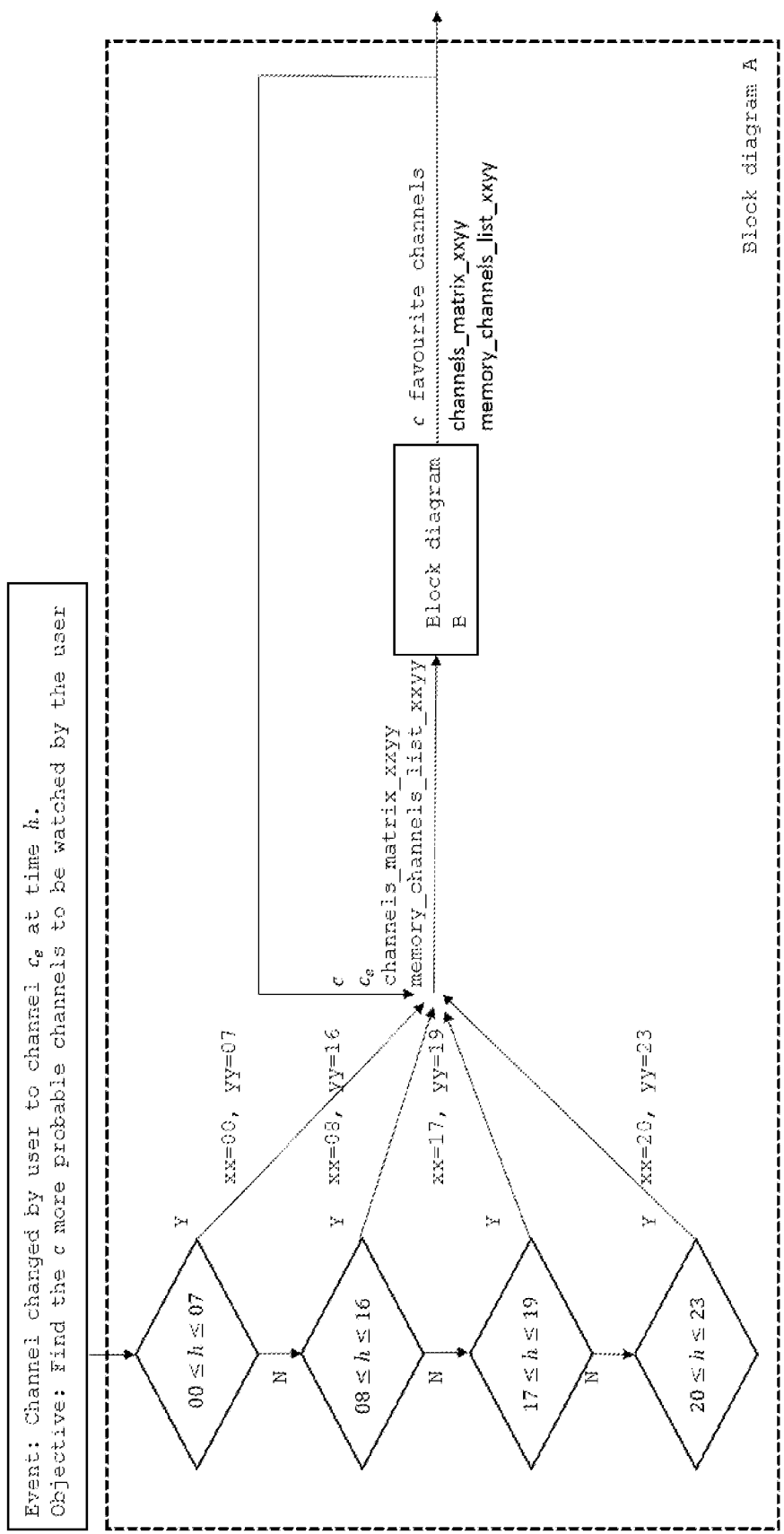
FIG. 1 is a flowchart representing the predictive algorithm's first phase.
Figure 2:
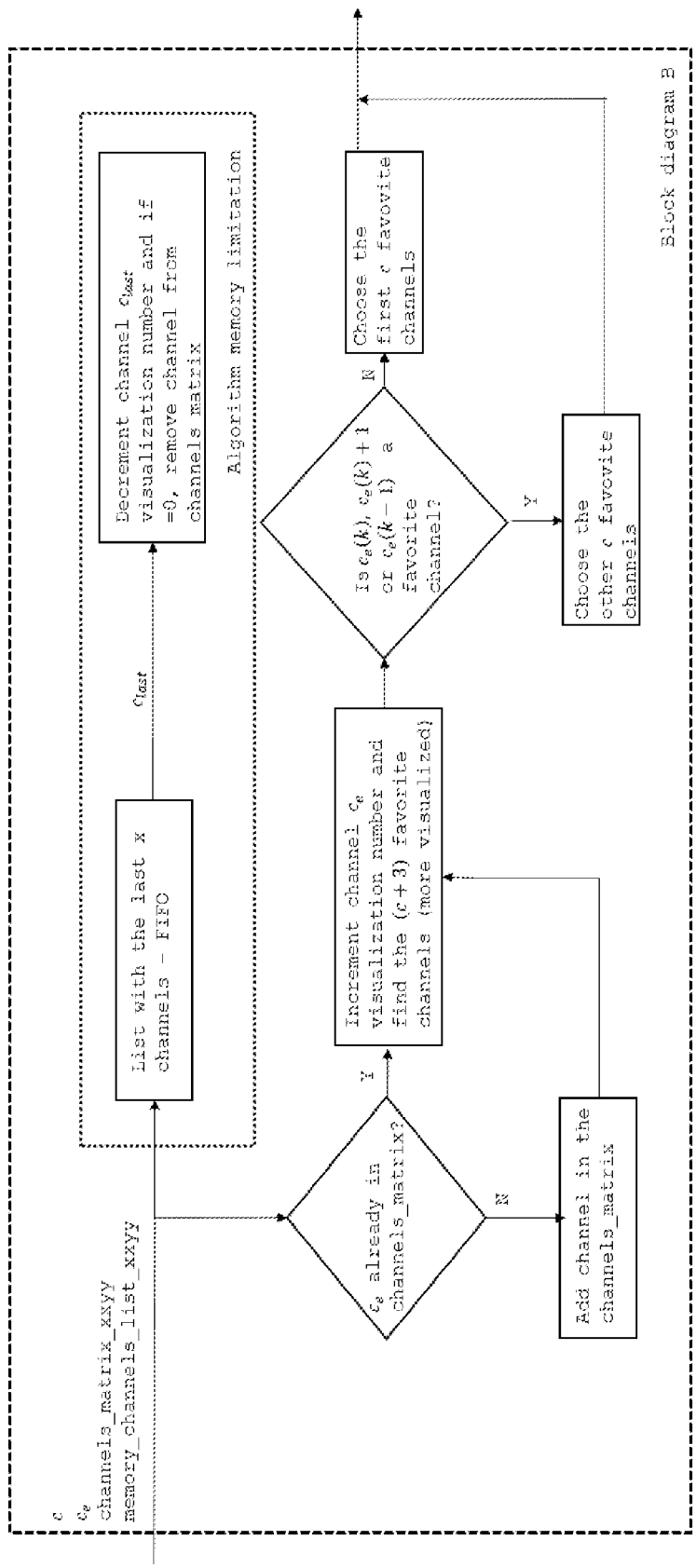
FIG. 2 illustrates the block diagram A representing the algorithm's second phase.
Figure 3:
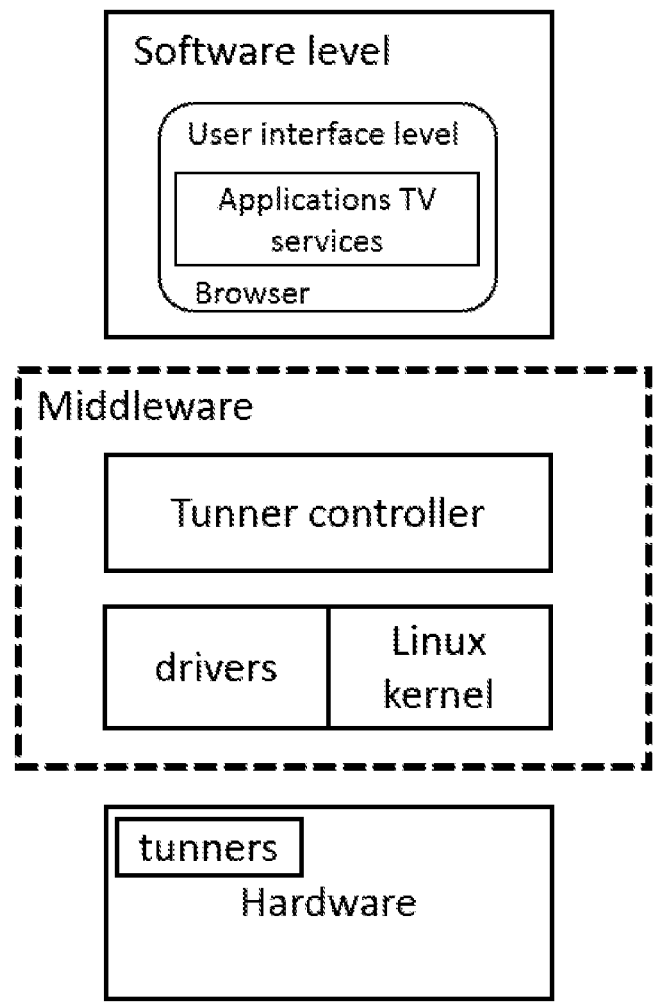
FIG. 3 represents the block level architecture relevant to the implementation of the predictive system.
Figure 4:
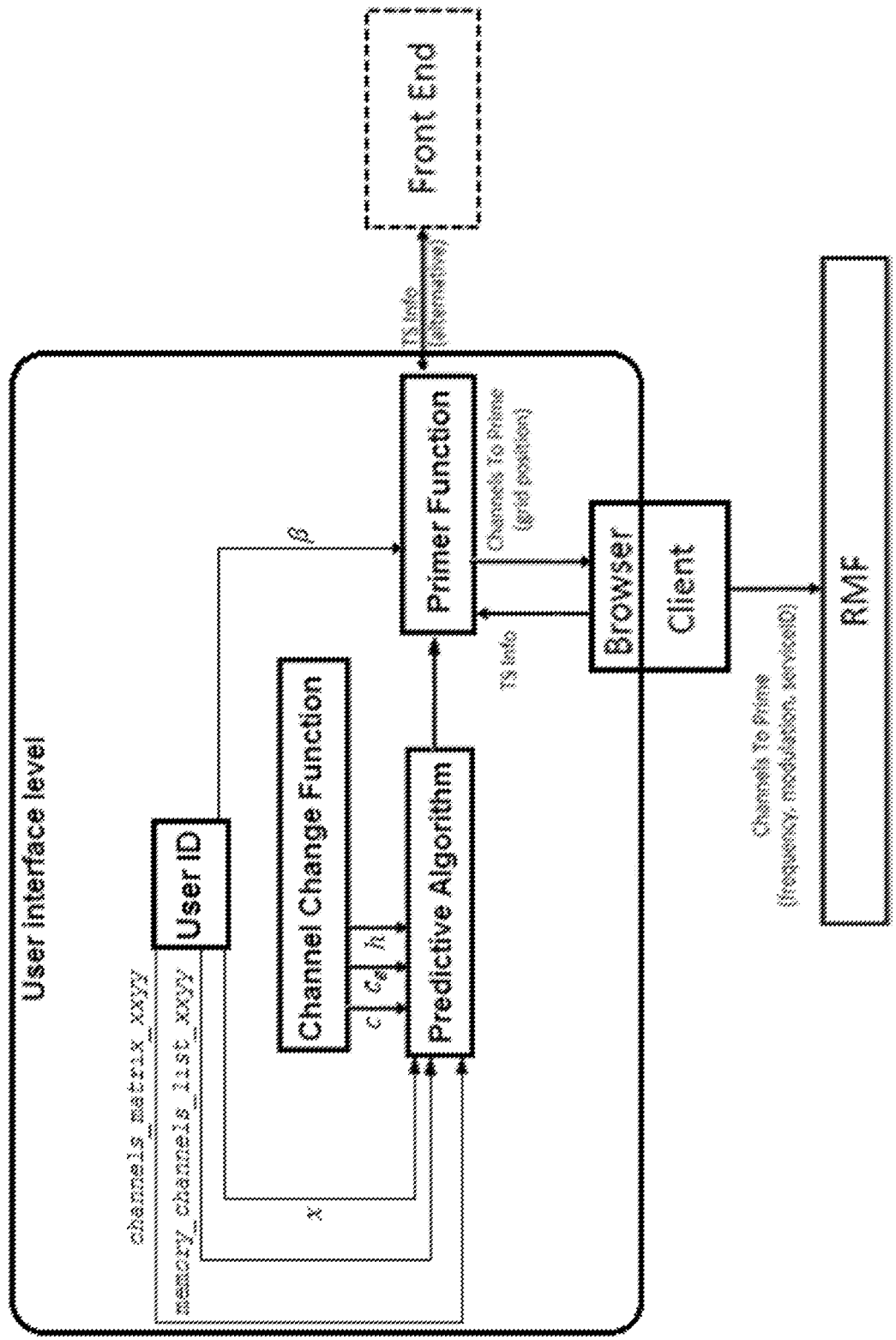
FIG. 4 illustrates the required APIs to implement the predictive system at the user interface level.

With reference to the figures, certain methods of implementation are now described in more detail. However, they are not intended to limit the scope of this application.

The system proposed herein solves the problem of reducing the tuning channel delay time, by predicting the user's behavior and it is characterized by an algorithm that suggest the more probable channels to be watched by the user. Said algorithm is supported by a STB architecture, with tree tuners, that is capable of not only pre-tuning a specific channel in a TS, but also to instantiate a given number of video decoding pipelines per TS.

Due to processing constrains at the hardware level, there is a limitation on the use of video primers. Taking this in account, and for the purpose of this description, STB architecture assumes a viable number of 5 video primers, two of them fixed and three more for the fine tuning of the predictive algorithm herein disclosed.

Considering this limitations, although there are 5 primers available, the STB only have 3 tuners. Therefore, the 5 most probable channels must belong to a maximum of 3 different transport streams (TS). Consider the following two cases:

a) The predecessor and the successor channels belong to the same TS, for instance, TS1.

It is possible to tune two more different TS, for instance, TS2 and TS3;

b) The predecessor and the successor channels belong to different TS, for instance TS1 and TS2. It is possible to tune one more different TS, for instance, TS3.

For the purpose of this preferred embodiment, it will be consider that the set-top box uses five primers and the algorithm suggest the three more probable channels to be watched by the user.

In this algorithm implemented and tested by using seven random clients channel zapping historical, from the above referred data base. The success in predicting the zapping with 2 (up/down) channels or 5 (up/down+3favorite) channels is shown in the table 1.

TABLE 1

Channel prediction success rate, with x = 100.

| Client | Client ID | Up/Down (%) | Predictive Algorithm success (%) |
|---|---|---|---|
| A | 00D0374CD901 | 53.81 | 74.98 |
| B | 00D0374CDAF9 | 13.98 | 77.17 |
| C | 00D0374CDA93 | 17.46 | 48.28 |
| D | 00D0374CD0C4 | 6.48 | 60.1 |
| E | 00D0374CCFAA | 11.55 | 67.38 |
| F | 00D0374CD604 | 14.37 | 72.51 |
| G | 00D0372F3A34 | 13.18 | 73.71 |
| Average | | 19 | 67 |

In general the up/down prediction is right ~19% of the times while with the three favorite channels, the success rate is increased to ~67%.

Note that although the algorithm was tested with only 1% of the total number of different clients in the data base, these results also include the extreme clients. Client A uses a lot the up/down zapping procedure while client D doesn't. Even for these extreme cases, the success rate of the channel prediction is increased.

The invention claimed is:

1. A predictive tuning algorithm configured to be implemented in a set-top box architecture, comprising pre-tuning a pre-defined number of channels, c, according to the following steps:

the set-top box, in every channel changed event, transmitting the following input variables to the predictive tuning algorithm:

a user identification;

a channel inputted by a user, $c_e$;

a respective time of watch, h;

the pre-defined number of channels, c;

a watched channels memory array corresponding to a time slot xxyy of h, wherein each time slot is comprised by a matrix of channels, channels_matrix_xxyy and a vector of channels memory_channels_list_xxyy;

updating and analyzing the watched channels memory array according to the channel inputted by the user;

outputting a number of the pre-defined number of channels, c, according to the watched channels memory array in that time slot and a fixed β channels that are always primed, wherein the channels_matrix_xxyy is a matrix with two rows and as many columns as the sum of the number of visualizations of the last x channels, and wherein the memory_channels_list_xxyy is a vector with a FIFO behavior and configurable number of columns, x, recording a channel's flow transition.

2. The predictive tuning algorithm according to claim 1, wherein the time slot has a configurable time period.

3. The predictive tuning algorithm according to claim 1, wherein the update of the watched channels memory array comprise the following steps:

in the channels_matrix_xxyy a decrement in one unit of a number of visualizations of a channel that leaves the memory_channels_list_xxyy; and in response to the number of visualizations of the channel becoming zero, remove the channel from the channels_matrix_xxyy by eliminating its column;

in the channels_matrix_xxyy an increment in one unit of a number of visualizations of a channel $c_e$ and record the channel in the memory_channels_list_xxyy;

for a first time watch in a last x watch channels, the $c_e$ is added to the channels_matrix_xxyy and its visualization number is incremented in one unit.

4. The predictive tuning algorithm according to claim 1, wherein the output of c channels is comprised by the following steps:

selecting (c+β) channels with the higher number of visualizations in the channels_matrix_xxyy and save the (c+β) channels in a favorite_channel_list;

in response to the channel $c_e$, or any of the β channels that are always primed, are not in the favorite_channel_list, select the pre-defined number of channels, c, in the favorite_channel_list; or in response to the channel $c_e$, or any of the β channels that are always primed, are in the favorite_channel_list, select the pre-defined number of channels, c, of the list other than $c_e$ or any of β channels.

5. A non-transitory computer-readable medium storing set-top box application framework implemented at a middleware level configured to interconnect a set-top box software layer running the predictive tuning algorithm of claim 1 and a set-top box hardware implementation layer; said application framework being configured to instantiate a set of video decoding pipelines for pre-tuning a predefined number of channels, (c+β), wherein c is the number of pre-defined number of channels outputted from a predictive tuning algorithm, and β is the number of channels that are always primed.

6. The non-transitory computer-readable medium of claim 5, wherein the application framework is configured to pre-tune a predefined number of channels, β, in addition to the channels outputted from the predictive algorithm, c, representing the antecessor and the predecessor channels of the currently tuned channel.

7. A predictive tuning system characterized by a Set-top box architecture comprising:
 θ number of tuners at the physical level;
 a software layer configured to execute a predictive tuning algorithm comprising pre-tuning a pre-defined number of channels, c, according to the following steps:
  set-top box, in every channel changed event, transmitting the following input variables to the predictive tuning algorithm:
   a user identification;
   a channel inputted by the user, $c_e$;
   respective time of watch, h;
   a pre-define number of channels, c;
   a watched channels memory array corresponding to the time slot xxyy of h;
  updating and analyzing the watched channels memory array according to the channel inputted by the user;
  outputting a number of c channels according to the watched channels memory array in that time slot and the fixed β channels that are always primed;
 a middleware layer comprising:
  the application framework of claim 6; and
  a client module configured to find a β number of fixed channels that are always primed.

8. A predictive tuning system characterized by a Set-top box architecture comprising:
 θ number of tuners at the physical level;
 a software layer configured to execute a predictive tuning algorithm comprising pre-tuning a pre-defined number of channels, c, according to the following steps:
  set-top box, in every channel changed event, transmitting the following input variables to the predictive tuning algorithm:
   a user identification;
   a channel inputted by the user, $c_e$;
   respective time of watch, h;
   a pre-define number of channels, c;
   a watched channels memory array corresponding to the time slot xxyy of h;
  updating and analyzing the watched channels memory array according to the channel inputted by the user;
  outputting a number of c channels according to the watched channels memory array in that time slot and the fixed β channels that are always primed;
 a middleware layer comprising:
  the application framework of claim 5; and
  a client module configured to find β number of fixed channels that are always primed.

9. The predictive tuning system according to claim 8, wherein the application framework is configured to instantiate a (c+β) number of video decoding pipelines for θ Transport Stream, wherein c is the predefined number of channels to be predicted.

10. The predictive tuning system according to claim 8, wherein the client module is configured to find the predecessor channel, $c_e$ (k)+1, and the antecessor channel, $c_e$ (k−1), of the currently tuned channel, $c_e$.

11. The predictive tuning system according to claim 10, wherein each of the (c+β) video decoding pipelines, wherein β=2, are configured to:
 pre-tune the predecessor channel, $c_e$ (k)+1, of the channel $c_e$;
 pre-tune the antecessor channel, $c_e$ (k−1), of the channel $c_e$;
 pre-tune c channels.

12. The predictive tuning system according to claim 8, wherein each of the θ tuners are configured to tune a specific Transport Stream carrier.

* * * * *